(12) United States Patent
Opaluch

(10) Patent No.: US 7,579,547 B2
(45) Date of Patent: Aug. 25, 2009

(54) ADJUSTABLE INTERFACE DEVICE

(75) Inventor: Robert Edward Opaluch, East Providence, RI (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 11/557,344

(22) Filed: Nov. 7, 2006

(65) Prior Publication Data

US 2008/0121424 A1 May 29, 2008

(51) Int. Cl.
*H01J 5/00* (2006.01)
(52) U.S. Cl. .................... 174/50; 174/58; 174/64; 174/135; 248/906; 439/535
(58) Field of Classification Search ............. 174/50, 174/58, 66, 64, 17 CT, 63, 481, 135; 220/4.02, 220/3.94, 241; 248/906; 439/335
See application file for complete search history.

(56) References Cited

OTHER PUBLICATIONS

Photographs of a first Optical Network Terminal offered by Motorola Company (2 pages).
Photographs of a second Optical Network Terminal offered by Motorola Company (2 pages).

*Primary Examiner*—Dhiru R Patel

(57) ABSTRACT

A container suitable as an interface device is provided. The container includes a plurality of walls that define an internal space for storage. The walls include movable portions that correspond to a wiring area within the internal space. The container includes at least a first and a second configuration. In the first configuration, the wiring area is enclosed on at least three sides by the movable portions of the wall. In the second configuration, the movable portions are positioned such that the wiring area is accessible on at least three sides free of any impediments from the container. The container may include an adjustable storage capacity to optimize the overall size of the container to the equipment or other content stored within the container, i.e. minimizing the overall size of the container to match the stored equipment and expanding when needed to accommodate additional equipment.

16 Claims, 5 Drawing Sheets

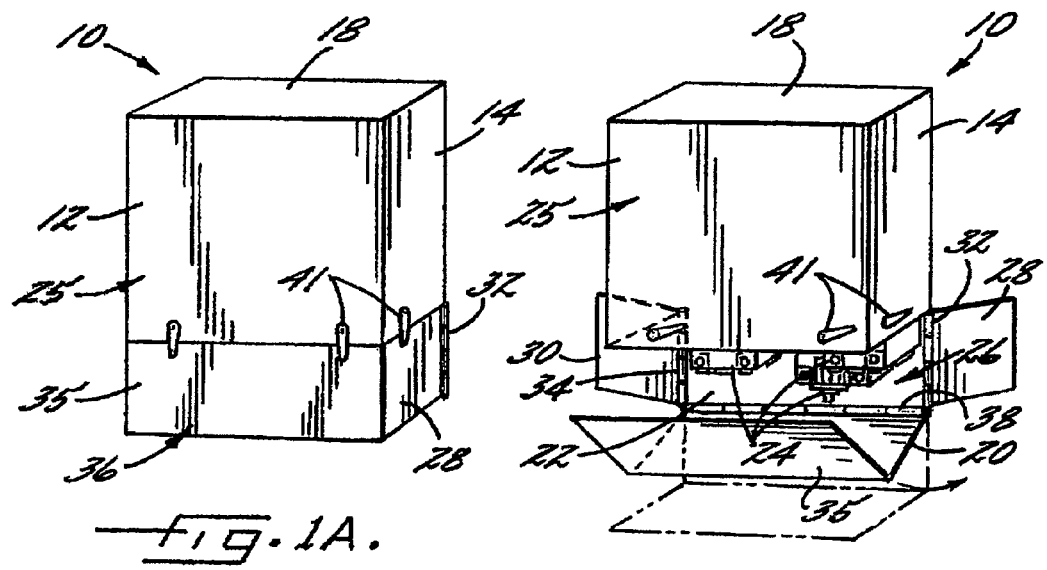
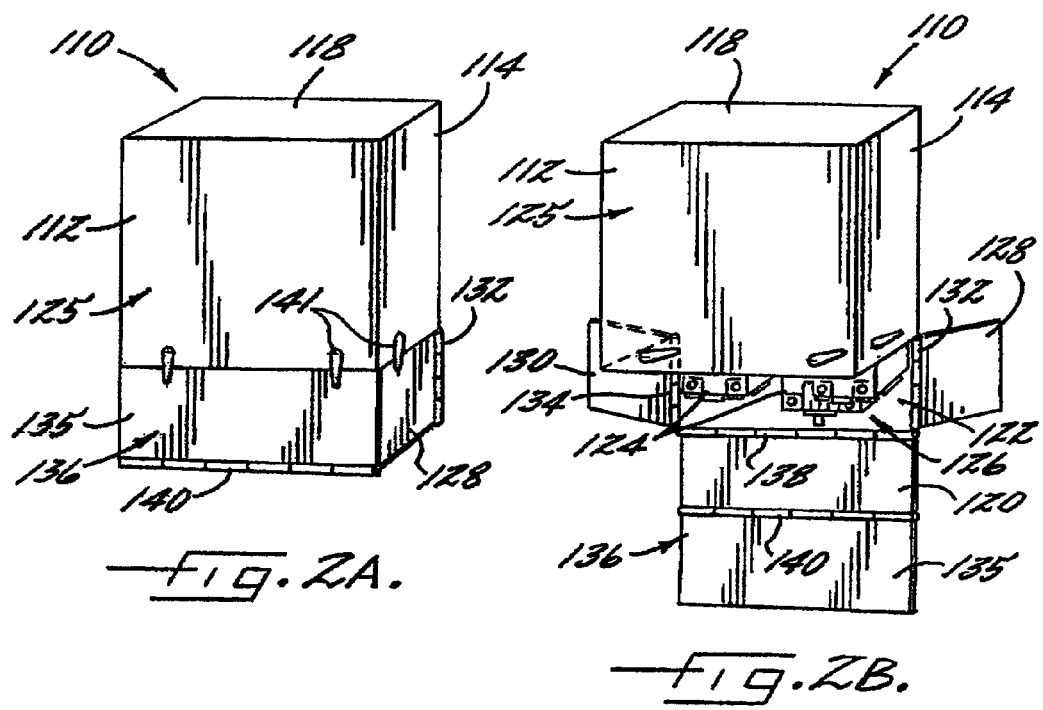

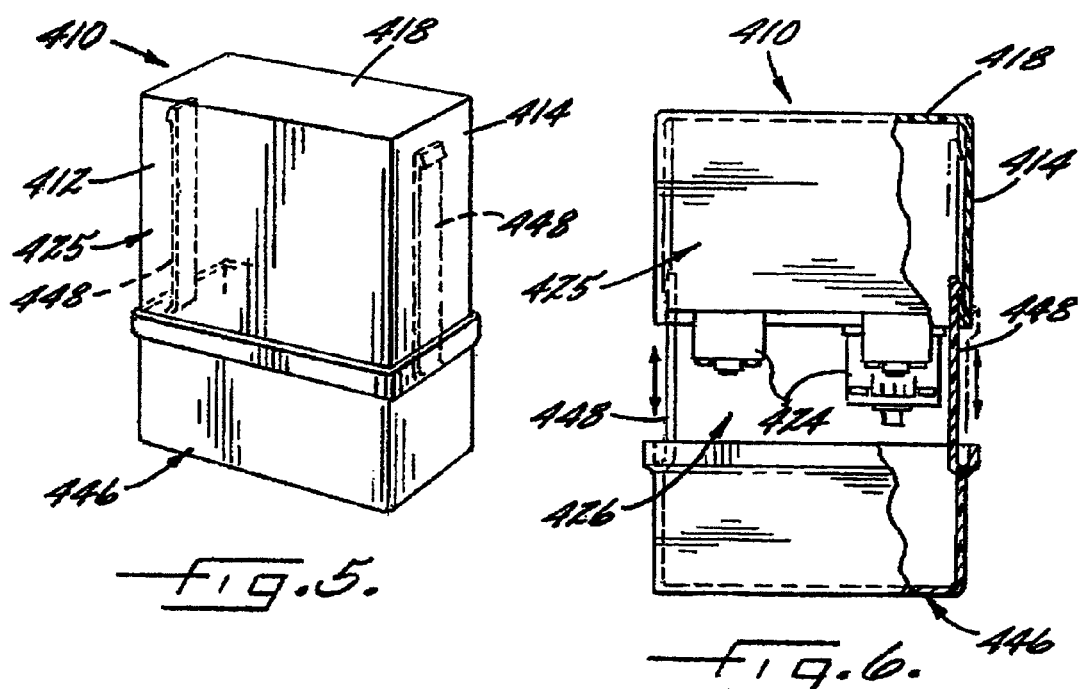
Fig. 5.
Fig. 6.
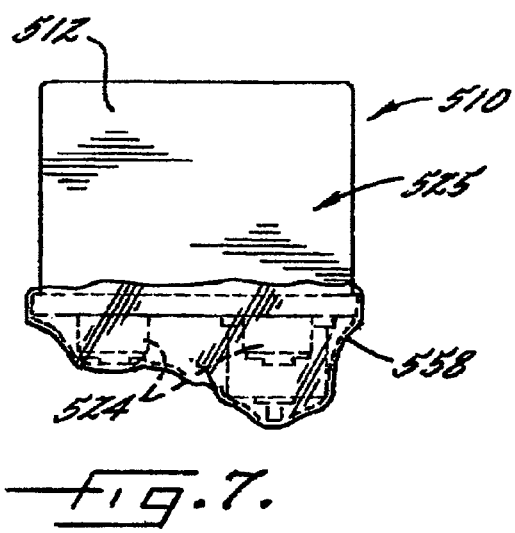
Fig. 7.

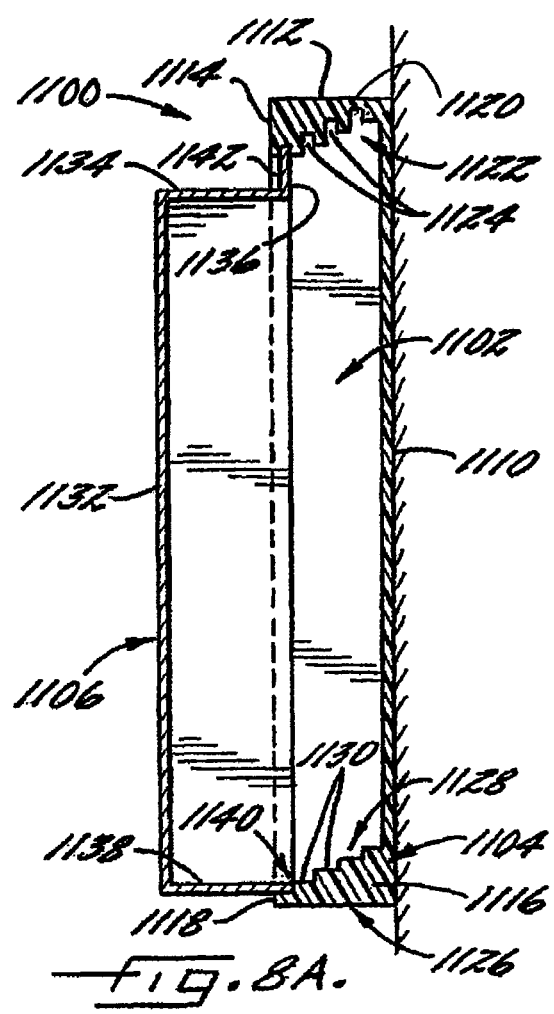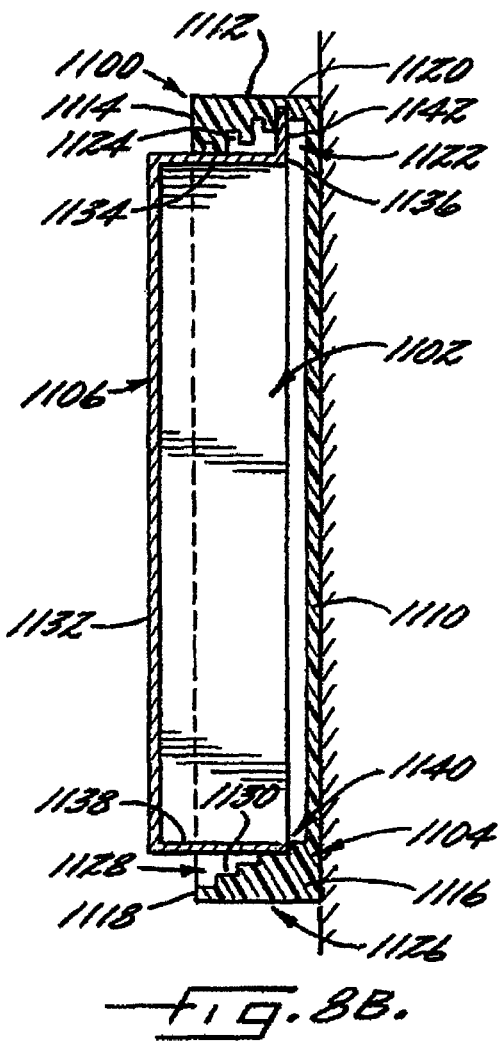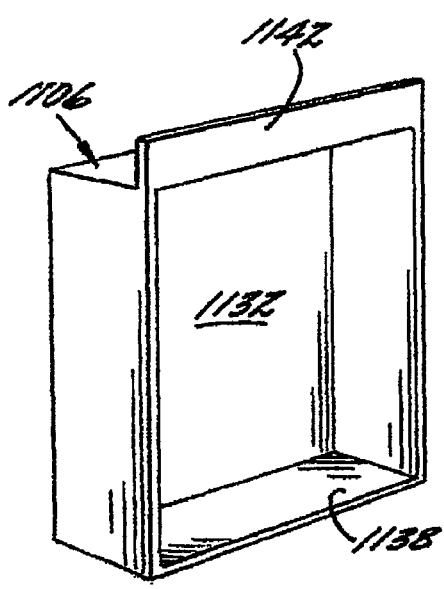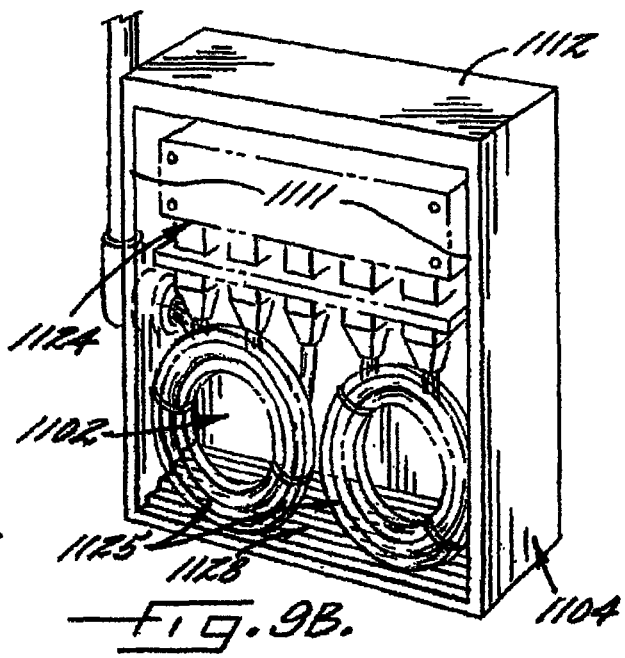

ADJUSTABLE INTERFACE DEVICE

BACKGROUND OF THE INVENTION

In general, an interface device is a container or enclosure adapted to support connectors, wires, cables, and other hardware for connecting two or more systems or networks together. An interface device may be referred to according to the systems being connected. For example, an optical network terminal or a telecommunication interface device is commonly used to connect the internal telephone or cable network of a house or other building to an external grid or network of transmission wires and cables extending between residential or commercial buildings.

Typically, the interface device is mounted to the outside of the building. Regardless of the exact location of the interface, the building owner usually wants the interface to be as small as possible for storage and aesthetic purposes. However, small interface devices have limited storage capacity for hardware and provide little to no space for service technicians to work with the hardware contained within the interface device.

Even in applications where the limited space of a relative small interface device may be large enough to hold the necessary hardware today, the interface device may not be able to support new hardware for future upgrades or additional connections. Therefore it is likely that a typical interface device may have to be replaced in order to support upgrades or changes to the systems, which adds cost.

Regarding the service technicians, typically the walls or other components of the interface device impedes the access to the stored hardware by blocking or getting in the way of the hands or tools of the service technicians. A common problem is the side walls of the interface devices. Usually the hardware is set back and between two side walls of the interface device, when the service technician reaches in with a tool or hand, often the side walls block his or her hand or limit the movement of the tool between the side walls. Another problem may be the access panel of the interface device. Typically, the interface device has an access panel that may be opened along a hinge attached to the side of the interface device. However, even in an open state the access panel and the hinge may further impede access to the hardware in the interface device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1a is a perspective view of a container according to an embodiment of the present invention;

FIG. 1b is a perspective view of the container of FIG. 1a in an opened configuration;

FIG. 2a is a perspective view of a container according to another embodiment of the present invention;

FIG. 2b is a perspective view of the container of FIG. 2a in an opened configuration;

FIG. 5 is a perspective view of a container according to yet another embodiment of the present invention;

FIG. 6 is a front view of the container of FIG. 5 in an opened configuration;

FIG. 7 is a front view of a container according to yet another embodiment of the present invention;

FIG. 8a is a side cross-section view of a container according to yet another embodiment of the present invention, wherein the storage capacity is maximized;

FIG. 8b is a side cross-section view of the container of FIG. 8a, wherein the storage capacity is minimized;

FIG. 9a is a perspective view of the cover of a container according to yet another embodiment of the present invention;

FIG. 9b is a perspective view of the storage tray of the container of FIG. 9a;

DETAILED DESCRIPTION

Figure 3A:
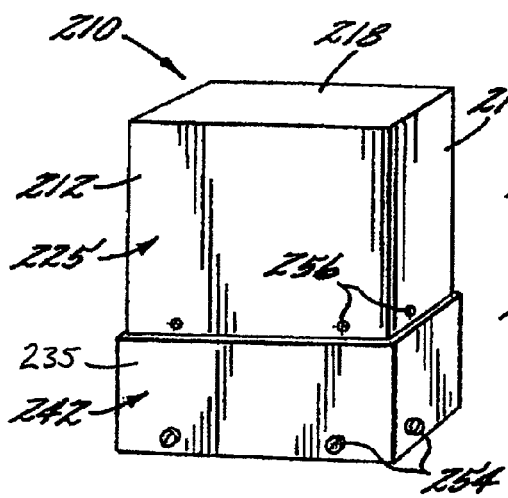
FIG. 3a is a perspective view of a container according to yet another embodiment of the present invention.

Preferred embodiments of the present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

In general, the illustrated embodiments of the present invention provide a container for supporting and containing a variety of hardware equipment. Although the container is primarily described herein as an interface device, such as an optical network device, for supporting telecom or cable equipment, including analog and digital electronics and other copper voice technology, coax cable TV technology, and satellite technology related equipment, the container may be used in a variety of applications and purposes. Other applications include, but are not limited to, tool boxes, ski racks, luggage, laundry baskets, barrels, and tractor trailers.

According to an embodiment of the present invention, an interface device is provided that includes a front wall, a back wall, and at least first and second side walls. The walls define an internal space for storage. And each of the front wall and the first and second side walls includes a portion that corresponds to a wiring area of the internal space. Each of these portions is movable from at least a first configuration of the interface device to a second configuration of the interface device. In the first configuration, the portions substantially enclose the wiring area on at least three sides. In the second configuration, the wiring area is accessible on the at least three sides free of any impediment from the portions of the front wall and two side walls, thereby facilitating access to the wiring area by, for example, a technician.

In another embodiment of the present invention, a network terminal is provided that includes a container and one or more connectors. The container extends from between opposed ends and defines an internal space for storage. Each connector has a terminal end and is positioned substantially within the internal space of the container such that the terminal ends of the connectors are generally within a wiring area of the internal space defined by the container. The container includes at least a first configuration and a second configuration. In the first configuration, the container encloses the wiring area on at least three sides. And in the second configuration, the wiring area is accessible through at least three sides free of any impediment from the container, thereby again facilitating access to the wiring area by, for example, the technician.

In yet another embodiment, a container is provided that includes a storage tray and a cover. The storage tray includes a back wall of the container and at least a top wall and a bottom wall of the storage tray. The top wall of the storage tray defines at least a first slot and a second slot. And the bottom wall of the storage tray defines at least a first stop and a second stop. The first slot is opposite the first stop and the second slot is opposite the second stop. The cover includes a front wall of the container, at least a top wall and a bottom wall of the cover, and a flange. The flange extends from the top wall of the cover. In a first configuration of the container the flange and the top wall of the container engage the first stop and first slot. And in a second configuration of the container, the flange and the top wall of the container engage the second stop and the second slot. A distance between the front wall and the back wall at least partially defines a storage capacity of the container and the distance and the storage capacity is greater in the first configuration than in the second configuration.

As shown in the embodiment illustrated in FIGS. 1a and 1b, the container 10 includes a number of walls forming an internal space. More specifically, the container 10 may include a front wall 12 and at least a first side wall 14 and a second side wall (not visible in the Figures). The side walls 14 generally extend in perpendicular direction from side edges of the front wall 12 to distal ends of the side walls 14. The container 10 may also include a top wall 18 extending in a generally perpendicular direction from a top end of the front wall 12 to a distal end, a bottom wall 20 extending in a generally perpendicular direction from a bottom end of the front wall 12 to a distal end, and a back wall 22 extending from the distal ends of the side walls 14, the top wall 18, and the bottom wall 20. While the walls are described and shown to extend in generally perpendicular direction in the illustrated embodiments, the walls may have other relative orientations in other embodiments.

The container may be adapted for mounting to a wall. The back wall may include a number of apertures for receiving fasteners or the container may include a number of brackets or other support members for attaching the back wall or other portions of the container to an external structure, such as a wall of a building.

The container is also adapted to contain a variety of hardware equipment within its internal space. The equipment may be positioned within the internal space of the container, while being supported by an external support member. For example, at least some of the equipment may be supported directly by the wall of the building. Or the equipment may be positioned within and supported by the container. For example, the equipment may be attached to the back wall of the container or the container may include a number of brackets or other support members for supporting and positioning the equipment within the enclosure.

The equipment may vary. For example and as stated previously, the container may function as an interface device and contain and/or support telephone or cable equipment including, but not limited to, connectors for connecting wires and cables, such as coaxial or fiber optic cables. As a more specific example, excess fiber optic cable may be stored within the container. Moreover, the container may be configured to provide enough space such that the excess fiber optic cable is stored in a configuration that minimizes any crimping or other damage to the fiber optic cable, such as but not limited to a coil having a relative large curve radius. Also, as shown, one or more of the connectors may be positioned within the container such that the input/output terminals 24 of the connectors are generally aligned or located in a particular area of the enclosure. This particular area may be referred to as a wiring area 26 due to the wiring or connecting of the wires and cables to the terminals 24 of the connectors. Moreover, the wiring area is accessible to a user, such as a service technician, to allow the service technician to wire and connect the wires and cables to the terminals of the connectors.

According to the embodiments illustrated in FIGS. 1a through 7, the container includes one or more movable members or portions for enabling at least two configurations. In a first configuration, the walls of the container generally surround or enclose the equipment. Surrounding the equipment in such a manner may have several purposes including protecting the equipment from the environment, limiting access to the equipment, preventing theft or vandalism, or hiding the equipment for aesthetic purposes. In the first configuration, the overall size of the container may be reduced to the size and shape of the contained equipment. In a second configuration, at least a portion of the container is opened for providing accessibility to the wiring area. In particular, the portions of the front wall and the side walls corresponding to the wiring area enclose the wiring area on at least three sides in the first configuration of the container. And the portions of the front wall and the side walls corresponding to the wiring area are moveable into positions for the second configuration of the container such that these portions do not impede or interfere with a service technician's ability to wire and connect the wires and cables to the terminals, i.e. the portions provide access to the wiring area on at least three sides.

FIG. 1a illustrates an embodiment of the present invention in which the container 10 is in a substantially closed configuration where the walls 12, 14, 18, 20, 22 of the container surround the equipment. FIG. 1b illustrates the container 10 in an opened configuration where portions 28, 30, 35, 36 of the walls that correspond to, e.g., define and/or surround, the wiring area 26 are moved away such that the service technician, or another user, has complete access to the wiring area 26 without impediment from the container 10 other than the back wall 22.

More specifically, according to the illustrated embodiment of FIGS. 1a and 1b, one or more of the terminals 24 of the connectors are generally located in the bottom region of the container, and thus the wiring area 26 is generally the internal space of the bottom region of the container 10. Each of the side walls 14 define a side flap portion 28, 30 that is rotatable about a hinge 32, 34 located proximate the distal end of the side wall 28, 30 from a generally perpendicular position relative to the front wall 12, as shown in FIG. 1a, to a generally parallel and aligned position relative to the back wall 22, as shown in FIG. 1b. The bottom end 35 of the front wall and the bottom wall 20 together define a bottom flap portion 36 that is rotatable about a hinge 38 located proximate the distal end of the bottom wall 20 from a position in which the bottom wall 20 is generally perpendicular to the front wall 12 to a position in which the bottom wall 20 is generally parallel and aligned to the back wall 22.

Terms such as top, bottom, back, front, and side are used herein and the appended claims for descriptive purposes. The terms are not intended to limit an embodiment of the container to a specific orientation; rather the terms generally describe a relative orientation between the walls, portions, or other components of the container.

The slide flaps portions 28, 30 and the bottom flap portion 36 may be secured in one or more of the opened and closed configurations by a variety of mechanisms. For example, as shown, the flap portions 28, 30, 36 may be secured in the closed configuration by a number of latches 41 secured to the rest of the container above the wiring area 26, referred to herein as a body portion 25 of the container.

As shown in the container 110 of FIGS. 2a and 2b, the bottom flap portion 136 may further include a second hinge 140 between the bottom wall 120 and the bottom end 135 of the front wall 112. The second hinge 140 allows for the bottom end 135 of the front wall 112 to rotate independently from the bottom wall 120. As shown in FIG. 2b, the bottom end 135 of the front wall 112 may be positioned such that it is generally parallel and aligned to the bottom wall 120.

Figure 3B:
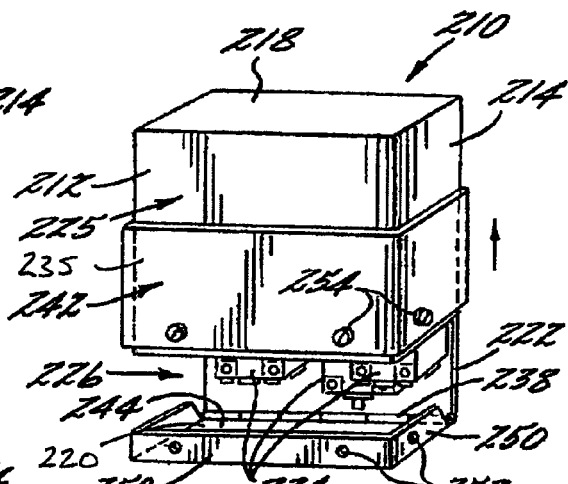
FIG. 3b is a perspective view of the container of FIG. 3a in an intermediate configuration.
Figure 3C:
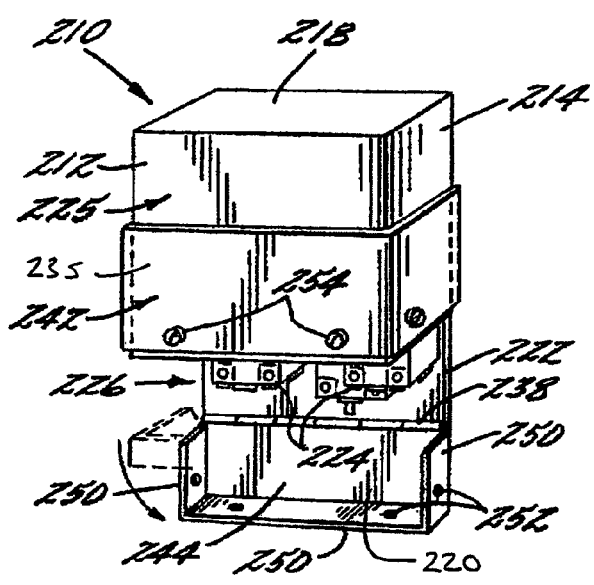
FIG. 3c is a perspective view of the container of FIG. 3a in an opened configuration.

As shown in the container 210 of FIGS. 3a through 3c, the portions of the side walls 214 and the bottom end 235 of the front wall 212 that correspond to the wiring area 226 may be linked such that they are movable together between opened and closed configurations. For example according to the embodiment illustrated in FIGS. 3a, 3b, and 3c, the portions of the side wall 214 and the bottom end 235 of the front wall 212 that correspond to the wiring area 226 define a sleeve 242. The sleeve 242 is movable along the rest of the container 210 from a closed configuration, as shown in FIG. 3a, to an opened configuration, as shown in FIG. 3c. The sliding of the sleeve 242 along the rest of the container may be facilitated by a variety of mechanisms. For example, the portions of the side walls above the wiring area may each include a groove extending along the length of the side wall configured to receive a protrusion extending from an inner surface of the sleeve.

The bottom wall 220 may define a bottom flap portion 244 that is rotatable about a hinge 238 located proximate to the distal end of the bottom wall 220 from a position in which the bottom wall 220 is generally perpendicular to the front wall 212 to a position in which the bottom wall 220 is generally parallel and aligned to the back wall 222.

The sleeve 242 and the bottom flap portion 244 may be securable in one or more of the opened and closed configurations by a variety of mechanisms. For example, as shown, the bottom flap portion 244 may include a lip 250 that extends around at least a portion of the bottom flap portion 244. The lip 250 may define a number of apertures 252. The apertures 252 of the lip may correspond to apertures near the bottom edges of the sleeve. In the closed configurations, fasteners 254 may engage the apertures 252 of both the sleeve and bottom flap portion and secure or link the sleeve 242 and bottom flap portion 244 together. In the opened configuration, the fasteners 254 of the sleeve may align with apertures 256 in the rest of the container, i.e. the body portion 225 of the container, such that the sleeve 242 can by secured in the opened configuration by engaging the apertures of the sleeve and the apertures 256 in the body portion 225 of the container with the fasteners 254.

Although the sleeve is illustrated as sliding on the outside of the body portion 225 of the container, in other embodiments the sleeve may be configured to slide on the inside of the body portion of the container. Moreover, in some embodiments, the sleeve may be substantially hidden within the body portion of the container in the open configuration.

Figure 4:
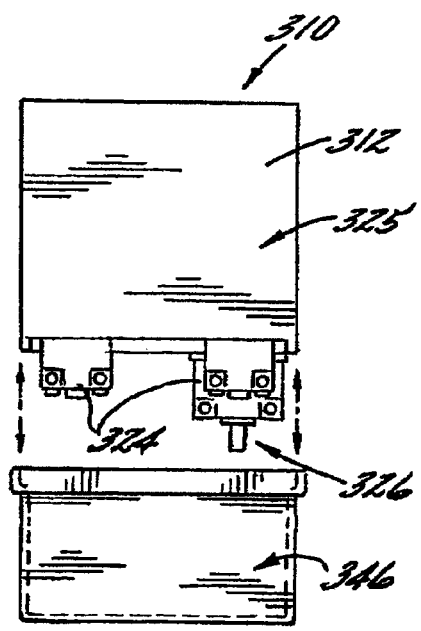
FIG. 4 is a front view of a container according to yet another embodiment of the present invention.

As shown in the embodiment illustrated in FIG. 4, a bottom end of the back wall, the portions of the side walls, and the bottom end of the front wall that correspond to the wiring area 326 may be linked such that they move together between opened and closed configurations. For example, as shown the portions of the side walls, the bottom end of the front wall, the bottom wall, and the bottom end of the back wall that correspond to the wiring area 326 may define a cap 346 that is removable from the body portion 325 of the container 310. In the closed configuration, the cap 346 is attached to the body portion of the container 310 such that the wiring area 326 is enclosed by the cap 346. In the opened configuration, the cap 346 is removed and the wiring area 326 is accessible without any impediment from the walls of the container 310. The cap 346 may be attached to the body portion 325 of the container 310 by a variety of mechanisms including, but not limited to, one or more fasteners, such as hooks and screws, or by a snap fit between the cap 346 and the body portion 325 of the container 310.

FIGS. 5 and 6 illustrate another embodiment of the container 410 that includes mechanical sliding joints 448 for moving the cap 446 between an opened configuration and a closed configuration. In the closed configuration, as shown in FIG. 5, the wiring area 426 is enclosed by the cap 446. In the open configuration, as shown in FIG. 6, the cap 446 is moved downwardly from the body portion 425 of the container 410 such that the wiring area 426 is accessible. To further the accessibility of the wiring area 426 in the opened configuration, the mechanical sliding joints 448 may be configured to be detachable from the body portion 425 of the container 410.

FIG. 7 illustrates yet another embodiment of the present invention. The cap of the embodiments of FIGS. 5 and 6 may be replaced with a flexible membrane cover 558. The flexible membrane cover 558 may be made from a variety of materials, including differing materials from the body portion 525 of the container 510. For example, the membrane cover 558 may be made from a weather-proof material for providing protection to the electronic connectors, including the terminals 524. The membrane cover 558 may also be of an elastic material that can conform to the shape of the electronic connectors and thus minimize the overall shape of the container 510 when the membrane cover 558 is attached to the body portion 525 of the container 510 as shown in FIG. 7.

FIGS. 8a and 8b illustrate another embodiment of the present invention in which the container 1100 has at least two closed configurations. The walls of the container are configured to substantially surround any equipment stored or contained within the container. The overall size of the internal space 1102, i.e. storage capacity, of the container differs between the closed configurations. For example and as shown, the expanded and closed configuration of FIG. 8a provides more storage capacity, compared to the retracted and closed configuration of FIG. 8b. The adjustable storage capacity allows for the container to minimize the overall size of the container while providing enough storage capacity for a given load of equipment. More specifically, as equipment is added to the container, the overall size and storage capacity of the container may grow to accommodate the added equipment. For example, as best illustrated in FIG. 9b, the adjustable storage capacity 1102 may be used to store excess or slack cable, such as but not limited to fiber optic cable. Again as shown FIG. 9b, the adjustable storage capacity 1102 may accommodate a coil of fiber optic cable 1125, with the coil or other configuration having a great enough curve radius for minimizing any crimping or other damage the cable. Conversely, as equipment is removed from the container 1100, the overall size and storage capacity 1102 of the container 1100 may retract to reduce the overall size of the container 1100 when the additional storage is not necessary.

According to the illustrated embodiment of FIGS. 8a and 8b, the container 1100 includes a storage tray 1104 and a cover 1106. The cover 1106 is configured to engage the storage tray 1104 for providing an internal space 1102 for storage in between the cover 1106 and the storage tray 1104. In general, the cover 1106 may engage the storage tray 1104 at various depths within the storage tray 1104. The greater the depth at which the cover engages the storage tray, the less storage capacity is provided and the smaller the overall size of the container. The lesser the depth at which the cover engages the storage tray, the more storage capacity is provided and the larger the overall size of the container.

The storage tray 1104 includes a back wall 1110 of the container, a top wall 1112 extending generally perpendicular from a top edge of the back wall 1110 to a distal end 1114, a bottom wall 1116 extending generally perpendicular from a bottom edge of the back wall 1110 to a distal end 1118, and two side walls (not illustrated in FIGS. 8*a* and 8*b*), each side wall extending generally perpendicular from a side edge of the back wall to a distal end. The distal ends 1114, 1118 of the walls to the back wall 1110 define a depth of the storage tray 1104.

The top wall 1112 includes an outer side 1120 and an inner side 1122 that defines a thickness of the top wall 1112. The thickness generally decreases from the distal end 1114 to the back wall 1110. The inner side 1122 also defines a series of slots 1124 from the distal end 1114 of the top wall to the back wall 1110. The bottom wall 1116 includes an outer side 1126 and an inner side 1128 that defines a thickness of the bottom wall 1116. The thickness generally increases from the distal end 1118 to the back wall 1110. More specifically and as shown, the inner side 1128 defines a series of steps or stops 1130 from the distal end 1118 of the bottom wall to the back wall 1110. Also as shown, the slots 1124 of the top wall and the stops 1130 of the bottom wall correspond such that the straight distance from a slot 1124 of the top wall to an opposite and corresponding step 1130 of the bottom wall remains substantially constant for each pair of slot and step along the depth of the storage tray 1104.

The cover 1106 includes a front wall 1132 of the container, a top wall 1134 extending generally perpendicular from a top edge of the front wall to a distal end 1136, a bottom wall 1138 extending generally perpendicular from a bottom edge of the front wall to a distal end 1140, and two side walls (not illustrated), each side wall extending generally perpendicular from a side edge of the front wall. The cover 1106 further includes a flange 1142 extending from at least a portion of the distal end 1136 of the top wall in a direction generally parallel with the front wall 1132.

As shown, the flange 1142 of the cover and the distal end 1140 of the bottom wall of the cover are configured to engage a slot 1124 of the top wall of the storage tray and a corresponding stop 1130 of the bottom wall of the storage tray. Also, although not shown the side walls of the cover are configured to fit between the side walls of the storage tray. In general, the space between the front wall 1132 and the back wall 1110 represent the storage capacity of the container 1100. The storage capacity is maximized in FIG. 8*a* with the cover 1106 engaging the slot 1124 and stop 1130 furthest from the back wall 1110. The storage capacity and the overall size of the container 1100 are minimized in FIG. 8*b* with the cover 1106 engaging the slot 1124 and stop 1130 nearest the back wall 1110. The storage capacity and the overall size of the container 1100 may be further adjusted by positioning the cover to engage any one of the slots 1124 and the corresponding stops 1130 of the storage tray.

In order to access the storage space of the container, the cover may be completely removed from the storage tray. The stored equipment may vary. For example and as previously described above, the container may be an interface device, such as an optical network terminal. Therefore the equipment may be telephone and/or cable-related equipment. However, also as previously mentioned the application of the container may vary. Another example includes using the container illustrated in FIGS. 8*a* and 8*b* as luggage or as a storage bin mountable to the top of a car or other vehicle.

Figure 10A:
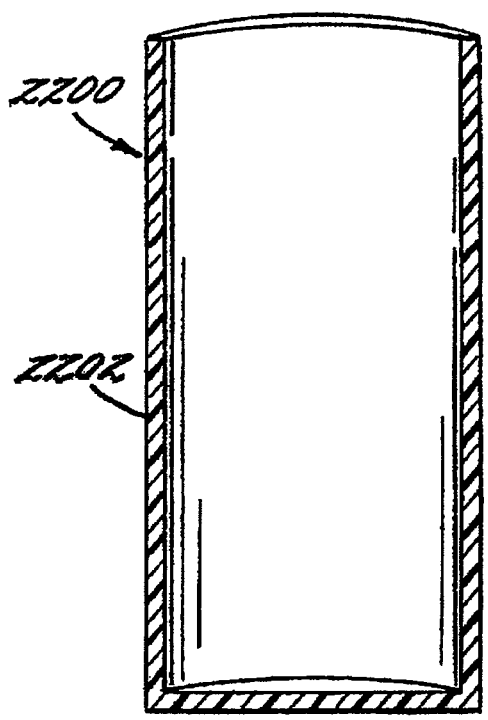
FIG. 10a is a side cross-section view of a container according to yet another embodiment of the present invention, wherein the storage capacity is maximized.
Figure 10B:
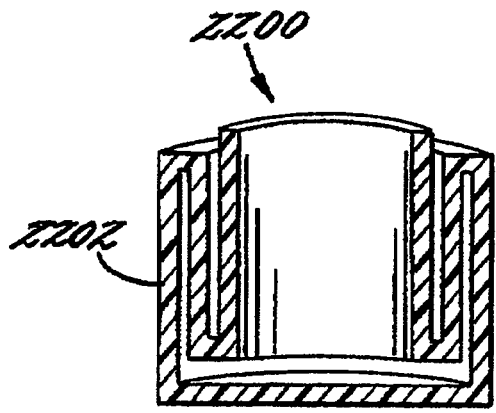
FIG. 10b is a side cross-section view of the container of FIG. 9b, wherein the storage capacity is minimized.

The corresponding slots and steps of illustrated embodiment of FIGS. 8*a* and 8*b* is one example for providing a container with an adjustable storage capacity and an adjustable size. However, the container may vary to include other structures or mechanism, such as clips, pegs, stand offs, or the like for adjusting the storage capacity and/or the overall size of the container and/or to support equipment stored within. For example, the wall or walls 2202 of the container 2200 may be made from a pliable material allowing the walls 2202 to fold over themselves to provide for a retracted configuration, as shown in FIG. 10*a*, or an extended configuration, as shown in FIG. 10*b*. As another example, the container may have segmented telescoping walls that allows for the segments of the walls to slide relative to each other between retracted and extended configurations (not illustrated).

In the preceding specification, various preferred embodiments have been described with reference to the accompanying drawings. It will however, be evident that various modifications and changes may be made thereto, and additional embodiments may be implemented, without departing from the broader scope of the invention as set forth in the claims that follow. The specification and drawings are accordingly regarded in an illustrative rather than a restrictive sense.

That which is claimed:

1. An interface device comprising:
a front wall, a back wall, and at least first and second side walls defining an internal space for storage; wherein each of the front wall and the first and second side walls includes a portion corresponding to a wiring area of the internal space and each portion is movable between at least a first configuration of the interface device, wherein the portions of the front wall and the first and second side walls substantially enclose the wiring area on at least three sides, and a second configuration of the interface device, wherein the wiring area is accessible on the at least three sides free of any impediment from the portions of the front wall and the first and second side walls.

2. The interface device according to claim 1, wherein the wiring area provides spacing for a fiber optic cable stored in a configuration such that the fiber optic cable is substantially free of crimping.

3. The interface device according to claim 1 further comprising a bottom wall that is coupled to the portion of the front wall corresponding to the wiring area, wherein the bottom wall and the portion of the front wall define a bottom flap rotatable between the first configuration and the second configuration.

4. The interface device according to claim 3 further comprising a first hinge positioned proximate the back wall and the bottom wall for rotating the bottom flap.

5. The interface device according to claim 4 further comprising a second hinge positioned proximate the bottom wall and the portion of the front wall for rotating the portion of the front wall independently from the bottom wall.

6. The interface device according to claim 1, wherein the portion of the first side wall corresponding to the wiring area defines a first side flap rotatable between the first configuration and the second configuration and the portion of the second side wall corresponding to the wiring area defines a second side flap rotatable between the first configuration and the second configuration.

7. The interface device according to claim 6 further comprising a first hinge positioned proximate the back wall and the first side flap for rotating the first side flap, wherein in the first configuration the side flap extends generally perpendicular to and between the front wall and the back wall and in the second configuration the first side flap extends generally parallel to and aligned with the back wall; and a second hinge positioned proximate the back wall and the second side flap for rotating the second side flap, wherein in the first configuration the side flap extends generally perpendicular to and between the front wall and the back wall and in the second configuration the second side flap extends generally parallel to and aligned with the back wall.

8. The interface device according to claim 1, wherein the portions of the front wall and the first and second side walls corresponding to the wiring area are coupled together and define a sleeve that is movable between the first and second configurations.

9. The interface device according to claim 8 further comprising a bottom wall that is movable between the first and second configurations.

10. The interface device according to claim 1 further comprising a bottom wall, and wherein the bottom wall, a portion of the back wall and the portions of the front wall and the first and second side walls corresponding to the wiring area are coupled together and define a cap movable between at least the first and second configurations.

11. The interface device according to claim 10, wherein the cap is removable from a body portion of (original) The interface device defined by the front wall, the back wall, and the first and second side walls.

12. The interface device of claim 1 in combination of one or more electronic connectors, each connector have a terminal end, wherein the electronic connectors are positioned within the internal space of (original) The interface device such that the terminal ends are within the wiring area.

13. A container comprising:
    a storage tray and a cover which mates with said tray, thereby forming said container;
    said storage tray including a back wall and at least a top wall and a bottom wall; wherein the top wall defines a series of slots and the bottom wall defines a corresponding series of stops, wherein each said slot is opposite and aligned with a different corresponding said stop; and
    said cover including a front wall, at least a top wall and a bottom wall, and a flange extending from the top wall of the cover; wherein in a first configuration of the container the flange engages a slot in the series of slots and the bottom wall engages the corresponding stop in the series of stops and in a second configuration of the container the flange engages another slot in the series of slots and the bottom wall engages another stop in the series of stops corresponding to said another slot;
    wherein a distance between the front wall and the back wall at least partially defines a storage capacity of the container and the distance and the storage capacity are different in the first configuration than in the second configuration.

14. The container according to claim 13, wherein the storage tray includes at least two side walls and the cover includes at least two side walls configured to fit between the at least two side walls of the storage tray.

15. The container according to claim 13 in combination with a fiber optic cable stored within the container.

16. The combination of claim 15, wherein the fiber optic cable is stored in a configuration such that the fiber optic cable is substantially free of crimping.

* * * * *